United States Patent
Bita et al.

(10) Patent No.: US 8,115,987 B2
(45) Date of Patent: Feb. 14, 2012

(54) MODULATING THE INTENSITY OF LIGHT FROM AN INTERFEROMETRIC REFLECTOR

(75) Inventors: Ion Bita, San Jose, CA (US); Lior Kogut, Haifa, IL (US); Ming Hau Tung, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 832 days.

(21) Appl. No.: 11/776,490

(22) Filed: Jul. 11, 2007

(65) Prior Publication Data
US 2008/0186581 A1   Aug. 7, 2008

Related U.S. Application Data

(60) Provisional application No. 60/887,791, filed on Feb. 1, 2007.

(51) Int. Cl.
G02B 26/00 (2006.01)

(52) U.S. Cl. ........................................ 359/291

(58) Field of Classification Search .......... 359/290–297
See application file for complete search history.

(56) References Cited

U.S. PATENT DOCUMENTS

| | | | |
|---|---|---|---|
| 2,590,906 A | 4/1952 | Tripp | |
| 2,677,714 A | 5/1954 | Auwarter | |
| 3,247,392 A | 4/1966 | Thelen | |
| 3,679,313 A | 7/1972 | Rosenberg | |
| 3,728,030 A | 4/1973 | Hawes | |
| 3,886,310 A | 5/1975 | Guldberg | |
| 3,955,190 A | 5/1976 | Teraishi | |
| 4,403,248 A | 9/1983 | te Velde | |
| 4,421,381 A | 12/1983 | Ueda et al. | |
| 4,441,789 A | 4/1984 | Pohlack | |
| 4,441,791 A | 4/1984 | Hornbeck | |
| 4,497,974 A | 2/1985 | Deckman et al. | |
| 4,498,953 A | 2/1985 | Cook et al. | |
| 4,560,435 A | 12/1985 | Brown et al. | |
| 4,655,554 A | 4/1987 | Armitage | |
| 4,705,361 A | 11/1987 | Frazier et al. | |
| 4,779,959 A * | 10/1988 | Saunders | 349/198 |
| 4,786,128 A | 11/1988 | Birnbach | |

(Continued)

FOREIGN PATENT DOCUMENTS
DE   10 2006 039 071   2/2008

(Continued)

OTHER PUBLICATIONS

Feenstra et al., Electrowetting displays, Liquivista BV, 16 pp., Jan. 2006.

(Continued)

*Primary Examiner* — Scott J Sugarman
*Assistant Examiner* — Vipin Patel
(74) *Attorney, Agent, or Firm* — Knobbe, Martens, Olson & Bear, LLP

(57) ABSTRACT

An optical device for modulating the intensity of light from an interferometric reflector. In one embodiment, the optical device can include an optical stack having a reflective layer and a partially reflective, partially transmissive layer for reflecting light. The optical device can also include a fluid cell comprising an absorptive fluid and a transmissive fluid. The optical device can also include a mechanism for controlling the portion of the reflector which is shadowed by the absorptive fluid.

45 Claims, 13 Drawing Sheets

U.S. PATENT DOCUMENTS

| | | | |
|---|---|---|---|
| 4,822,993 A | 4/1989 | Dillon et al. | |
| 4,859,060 A | 8/1989 | Katagiri et al. | |
| 4,925,259 A | 5/1990 | Emmett | |
| 4,954,789 A | 9/1990 | Sampsell | |
| 4,956,619 A | 9/1990 | Hornbeck | |
| 4,973,131 A | 11/1990 | Carnes | |
| 4,982,184 A | 1/1991 | Kirkwood | |
| 5,022,745 A | 6/1991 | Zayhowski et al. | |
| 5,028,939 A | 7/1991 | Hornbeck et al. | |
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,381,232 A | 1/1995 | van Wijk | |
| 5,452,138 A | 9/1995 | Mignardi et al. | |
| 5,471,341 A | 11/1995 | Warde et al. | |
| 5,526,172 A | 6/1996 | Kanack | |
| 5,550,373 A | 8/1996 | Cole et al. | |
| 5,559,358 A | 9/1996 | Burns et al. | |
| 5,561,523 A | 10/1996 | Blomberg et al. | |
| 5,597,736 A | 1/1997 | Sampsell | |
| 5,600,383 A | 2/1997 | Hornbeck | |
| 5,636,052 A | 6/1997 | Arney et al. | |
| 5,646,729 A | 7/1997 | Koskinen et al. | |
| 5,646,768 A | 7/1997 | Kaeiyama | |
| 5,661,592 A | 8/1997 | Bornstein et al. | |
| 5,665,997 A | 9/1997 | Weaver et al. | |
| 5,686,979 A * | 11/1997 | Weber et al. | 349/96 |
| 5,699,181 A | 12/1997 | Choi | |
| 5,710,656 A | 1/1998 | Goossen | |
| 5,719,068 A | 2/1998 | Suzawa et al. | |
| 5,726,805 A * | 3/1998 | Kaushik et al. | 359/589 |
| 5,734,177 A | 3/1998 | Sakamoto | |
| 5,771,116 A | 6/1998 | Miller et al. | |
| 5,786,927 A | 7/1998 | Greywall et al. | |
| 5,808,781 A | 9/1998 | Arney et al. | |
| 5,818,095 A | 10/1998 | Sampsell | |
| 5,825,528 A | 10/1998 | Goossen | |
| 5,838,484 A | 11/1998 | Goossen et al. | |
| 5,867,302 A | 2/1999 | Fleming | |
| 5,870,221 A | 2/1999 | Goossen | |
| 5,914,804 A | 6/1999 | Goossen | |
| 5,920,418 A | 7/1999 | Shiono et al. | |
| 5,961,848 A | 10/1999 | Jacquet et al. | |
| 6,028,689 A | 2/2000 | Michalicek et al. | |
| 6,031,653 A | 2/2000 | Wang | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,124,851 A | 9/2000 | Jacobsen | |
| 6,242,932 B1 | 6/2001 | Hembree | |
| 6,262,697 B1 | 7/2001 | Stephenson | |
| 6,301,000 B1 | 10/2001 | Johnson | |
| 6,323,987 B1 | 11/2001 | Rinaudo et al. | |
| 6,327,071 B1 | 12/2001 | Kimura | |
| 6,335,235 B1 | 1/2002 | Bhakta et al. | |
| 6,351,329 B1 | 2/2002 | Greywall | |
| 6,356,378 B1 | 3/2002 | Huibers | |
| 6,377,233 B2 | 4/2002 | Colgan et al. | |
| 6,381,022 B1 | 4/2002 | Zavracky | |
| 6,384,952 B1 | 5/2002 | Clark et al. | |
| 6,400,738 B1 | 6/2002 | Tucker et al. | |
| 6,433,917 B1 | 8/2002 | Mei et al. | |
| 6,437,583 B1 | 8/2002 | Tartagni et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,738,194 B1 | 5/2004 | Ramirez et al. | |
| 6,768,555 B2 | 7/2004 | Chen | |
| 6,794,119 B2 | 9/2004 | Miles | |
| 6,813,059 B2 | 11/2004 | Hunter et al. | |
| 6,836,366 B1 | 12/2004 | Flanders et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,654 B2 | 3/2005 | Lin et al. | |
| 6,882,458 B2 | 4/2005 | Lin et al. | |
| 6,882,461 B1 | 4/2005 | Tsai et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,980,350 B2 | 12/2005 | Hung et al. | |
| 6,982,820 B2 | 1/2006 | Tsai | |
| 7,002,726 B2 | 2/2006 | Patel et al. | |
| 7,006,272 B2 | 2/2006 | Tsai | |
| 7,009,754 B2 | 3/2006 | Huibers | |
| 7,027,204 B2 | 4/2006 | Trisnadi et al. | |
| 7,034,981 B2 | 4/2006 | Makigaki | |
| 7,046,422 B2 | 5/2006 | Kimura et al. | |
| 7,072,093 B2 | 7/2006 | Piehl et al. | |
| 7,113,339 B2 | 9/2006 | Taguchi et al. | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,184,195 B2 | 2/2007 | Yang | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,289,259 B2 | 10/2007 | Chui et al. | |
| 7,302,157 B2 | 11/2007 | Chui | |
| 7,321,457 B2 | 1/2008 | Heald | |
| 7,369,296 B2 * | 5/2008 | Floyd | 359/290 |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,405,852 B2 | 7/2008 | Brosnihan et al. | |
| 7,417,746 B2 | 8/2008 | Lin et al. | |
| 7,436,573 B2 | 10/2008 | Doan et al. | |
| 7,459,402 B2 | 12/2008 | Doan et al. | |
| 7,477,440 B1 | 1/2009 | Huang et al. | |
| 7,508,566 B2 * | 3/2009 | Feenstra et al. | 359/228 |
| 7,535,621 B2 | 5/2009 | Chiang | |
| 7,561,321 B2 | 7/2009 | Heald | |
| 7,566,664 B2 | 7/2009 | Yan et al. | |
| 7,567,373 B2 | 7/2009 | Chui et al. | |
| 7,629,197 B2 | 12/2009 | Luo et al. | |
| 7,672,060 B2 * | 3/2010 | Campbell | 359/666 |
| 7,782,523 B2 | 8/2010 | Ishii | |
| 7,852,544 B2 | 12/2010 | Sampsell | |
| 7,898,722 B2 | 3/2011 | Miles | |
| 2001/0003487 A1 | 6/2001 | Miles | |
| 2001/0028503 A1 | 10/2001 | Flanders et al. | |
| 2001/0043171 A1 | 11/2001 | Van Gorkom et al. | |
| 2002/0015215 A1 | 2/2002 | Miles | |
| 2002/0024711 A1 | 2/2002 | Miles | |
| 2002/0054424 A1 | 5/2002 | Miles | |
| 2002/0070931 A1 | 6/2002 | Ishikawa | |
| 2002/0075555 A1 | 6/2002 | Miles | |
| 2002/0126364 A1 | 9/2002 | Miles | |
| 2002/0146200 A1 | 10/2002 | Kurdle et al. | |
| 2002/0149828 A1 | 10/2002 | Miles | |
| 2002/0149834 A1 | 10/2002 | Mei et al. | |

| | | |
|---|---|---|
| 2002/0154422 A1 | 10/2002 | Sniegowski et al. |
| 2002/0197761 A1 | 12/2002 | Patel et al. |
| 2003/0011864 A1 | 1/2003 | Flanders |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0072070 A1 | 4/2003 | Miles |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0173504 A1 | 9/2003 | Cole et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0218251 A1 | 11/2004 | Piehl et al. |
| 2004/0240032 A1 | 12/2004 | Miles |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0249966 A1 | 11/2005 | Tung et al. |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0038643 A1 | 2/2006 | Xu et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066935 A1 | 3/2006 | Cummings et al. |
| 2006/0066936 A1 | 3/2006 | Chui et al. |
| 2006/0067643 A1 | 3/2006 | Chui |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings |
| 2006/0077516 A1 | 4/2006 | Kothari |
| 2006/0079048 A1 | 4/2006 | Sampsell |
| 2006/0082588 A1 | 4/2006 | Mizuno et al. |
| 2006/0082863 A1 | 4/2006 | Piehl et al. |
| 2006/0132927 A1* | 6/2006 | Yoon ............................ 359/665 |
| 2006/0180855 A1 | 8/2006 | Tsang |
| 2006/0220160 A1 | 10/2006 | Miles |
| 2006/0262126 A1 | 11/2006 | Miles |
| 2006/0262380 A1 | 11/2006 | Miles |
| 2006/0268388 A1 | 11/2006 | Miles |
| 2006/0274074 A1 | 12/2006 | Miles |
| 2006/0274398 A1 | 12/2006 | Chou |
| 2007/0020948 A1 | 1/2007 | Piehl et al. |
| 2007/0040777 A1 | 2/2007 | Cummings |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0121118 A1 | 5/2007 | Gally et al. |
| 2007/0138608 A1 | 6/2007 | Ikehashi |
| 2007/0153860 A1 | 7/2007 | Chang-Hasnain et al. |
| 2007/0177247 A1 | 8/2007 | Miles |
| 2007/0194630 A1 | 8/2007 | Mingard et al. |
| 2007/0216987 A1 | 9/2007 | Hagood et al. |
| 2007/0253054 A1 | 11/2007 | Miles |
| 2007/0279729 A1 | 12/2007 | Kothari et al. |
| 2007/0279730 A1 | 12/2007 | Heald |
| 2007/0285761 A1 | 12/2007 | Zhong et al. |
| 2008/0002299 A1 | 1/2008 | Thurn |
| 2008/0003710 A1 | 1/2008 | Kogut et al. |
| 2008/0013144 A1 | 1/2008 | Chui et al. |
| 2008/0013145 A1 | 1/2008 | Chui et al. |
| 2008/0013154 A1 | 1/2008 | Chui |
| 2008/0030657 A1 | 2/2008 | Wu et al. |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0068697 A1 | 3/2008 | Haluzak et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0158645 A1 | 7/2008 | Chiang |
| 2008/0247028 A1 | 10/2008 | Chui et al. |
| 2008/0297880 A1 | 12/2008 | Steckl et al. |
| 2009/0021884 A1 | 1/2009 | Nakamura |
| 2009/0068781 A1 | 3/2009 | Tung et al. |
| 2009/0080060 A1 | 3/2009 | Sampsell et al. |
| 2009/0135465 A1 | 5/2009 | Chui |
| 2009/0201566 A1 | 8/2009 | Kothari |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0256218 A1 | 10/2009 | Mignard et al. |
| 2009/0273823 A1 | 11/2009 | Tung et al. |
| 2009/0279162 A1 | 11/2009 | Chui |
| 2010/0039370 A1 | 2/2010 | Miles |
| 2010/0080890 A1 | 4/2010 | Tung et al. |
| 2010/0085626 A1 | 4/2010 | Tung et al. |
| 2010/0118382 A1 | 5/2010 | Kothari et al. |
| 2011/0019380 A1 | 1/2011 | Miles |
| 2011/0026096 A1 | 2/2011 | Miles |
| 2011/0038027 A1 | 2/2011 | Miles |
| 2011/0044496 A1 | 2/2011 | Chui et al. |
| 2011/0080632 A1 | 4/2011 | Miles |
| 2011/0116156 A1 | 5/2011 | Kothari |
| 2011/0134505 A1 | 6/2011 | Sasagawa |
| 2011/0170166 A1 | 7/2011 | Miles |
| 2011/0170167 A1 | 7/2011 | Miles |
| 2011/0188109 A1 | 8/2011 | Chui et al. |
| 2011/0188110 A1 | 8/2011 | Miles |

FOREIGN PATENT DOCUMENTS

| | | |
|---|---|---|
| EP | 0 035 299 | 9/1983 |
| EP | 0 668 490 | 8/1995 |
| EP | 0 695 959 | 2/1996 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 473 581 | 11/2004 |
| EP | 1 928 028 | 6/2008 |
| JP | 56-088111 | 7/1981 |
| JP | 5-49238 | 2/1993 |
| JP | 5-281479 | 10/1993 |
| JP | 08-051230 | 2/1996 |
| JP | 11211999 | 8/1999 |
| JP | 2002-062490 | 2/2000 |
| JP | 2000 147262 | 5/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2003 177336 | 6/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| JP | 2007 027150 | 2/2007 |
| WO | WO 98/14804 | 4/1998 |
| WO | WO 98/43129 | 10/1998 |
| WO | WO 99/52006 | 10/1999 |
| WO | WO 01/53113 | 7/2001 |
| WO | WO 02/24570 | 3/2002 |
| WO | WO 02/086582 | 10/2002 |
| WO | WO 03/105198 | 12/2003 |
| WO | WO 2006/035698 | 4/2006 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |

OTHER PUBLICATIONS

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Lezec, Submicrometer dimple array based interference color field displays and sensors, Nano Lett. 7(2):329-333, Dec. 23, 2006.

Longhurst, 1963, Chapter IX: Multiple Beam Interferometry, in Geometrical and Physical Optics, pp. 153-157.

Tolansky, 1948, Chapter II: Multiple-Beam Interference, in Multiple-bean Interferometry of Surfaces and Films, Oxford at the Clarendon Press, pp. 8-11.

Conner, "Hybrid Color Display Using Optical Interference Filter Array," SID Digest, pp. 577-580 (1993).

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Miles, Mark, W., "A New Reflective FPD Technoogy Using Interferometric Modulation", The Proceedings of the Society for Information Display (May 11-16, 1997).

Tail et al., "A transparent sheet display by plastic MEMS," Journal of the SID 14(8):735-741, 2006.

Londergan et al., Advanced processes for MEMS-based displays, Proceedings of the Asia Display 2007, SID, 1:107-112.

Nakagawa et al., Feb. 1, 2002, Wide-field-of-view narrow-band spectral filters based on photonic crystal nanocavities, Optics Letters, 27(3)1 91-193.

Brosnihan et al., Jun. 2003, Optical IMEMS—a fabrication process for MEMS optical switches with integrated on-chip electronic, Transducers, Solid-State Sensors, Actuators and Microsystems, $12^{th}$ International Conference 2003, 2(8-12):1638-1642.

Cacharelis et al., 1997, A Reflective-mode PPDLC Light Valve Display Technology, Proceedings of European Solid State Device Research Conference (ESSDERC), pp. 596-599.

Dokmeci et al., Dec. 2004, Two-axis single-crystal silicon micromirror arrays, Journal of Microelectromechanical Systems, 13(6):1006-1017.

Maier et al., 1996, 1.3" active matrix liquid crystal spatial light modulator with 508 dpi resolution, SPIE vol. 2754, pp. 171-179.

Billard, Tunable Capacitor, 5th Annual Review of LETI, Jun. 24, 2003, p. 7.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Mehregany et al., 1996, MEMS applications in optical systems, IEEE/LEOS 1996 Summer Topical Meetings, pp. 75-76.

Miles et al, Oct. 21, 1997, a MEMS based interferometric modulator (IMOD) for display applications, Proceedings of Sensors Expo, pp. 281-284.

Nieminen et al., 2004, Design of a temperature-stable RF MEM capacitor, IEEE Journal of Microelectromechanical Systems, 13(5):705-714.

Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

MODULATING THE INTENSITY OF LIGHT FROM AN INTERFEROMETRIC REFLECTOR

RELATED APPLICATIONS

This application claims priority to U.S. Provisional Patent Application No. 60/887,791, filed Feb. 1, 2007, and entitled "MODULATING THE INTENSITY OF LIGHT FROM AN INTERFEROMETRIC REFLECTOR," which is hereby incorporated by reference in its entirety.

BACKGROUND OF THE INVENTION

1. Field

The field of the invention relates to microelectromechanical systems (MEMS), and more particularly to displays comprising MEMS.

2. Description of the Related Art

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

A number of exemplary embodiments of the invention are disclosed. In one embodiment, an optical device is disclosed, the optical device comprising: an at least partially optically transmissive first surface; an optical stack spaced from the first surface, the optical stack comprising a reflective first layer and a partially reflective, partially transmissive second layer, the optical stack adapted to reflect light having a set of visible wavelengths determined by interference of light reflected from the first layer and from the second layer; a first fluid between the first surface and the optical stack; a second surface between the first surface and the optical stack, the first fluid covering a first portion of the second surface when a first voltage is applied to the device, and the first fluid covering a second portion of the second surface when a second voltage is applied to the device.

In another embodiment, a method for modulating light is disclosed, the method comprising: providing an optical device comprising: an at least partially optically transmissive first surface; an optical stack spaced from the first surface, the optical stack comprising a reflective first layer and a partially reflective, partially transmissive second layer, the optical stack adapted to reflect light having a set of visible wavelengths determined by interference of light reflected from the first layer and from the second layer; a first fluid between the first surface and the optical stack; and a second surface between the first surface and the optical stack; applying a first voltage to the device to cause the first fluid to cover a first portion of the second surface; and applying a second voltage to the device to cause the first fluid to cover a second portion of the second surface.

In another embodiment, a method of forming an optical device is disclosed, the method comprising: forming an optically transmissive first surface; forming an optical stack, the optical stack comprising a reflective first layer and a partially reflective, partially transmissive second layer; forming a perimeter wall of a cavity between the first surface and the optical stack; and placing fluid in the cavity.

In another embodiment, an optical device is disclosed, the optical device comprising: means for at least partially transmitting incident light; means for reflecting light having a set of visible wavelengths determined by interferometry; and means for varying an optical transmissivity of a region between the at least partially transmitting means and the reflecting means upon application of a voltage to the device.

DETAILED DESCRIPTION OF THE PREFERRED EMBODIMENT

The following detailed description is directed to certain specific embodiments of the invention. However, the invention can be embodied in a multitude of different ways. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
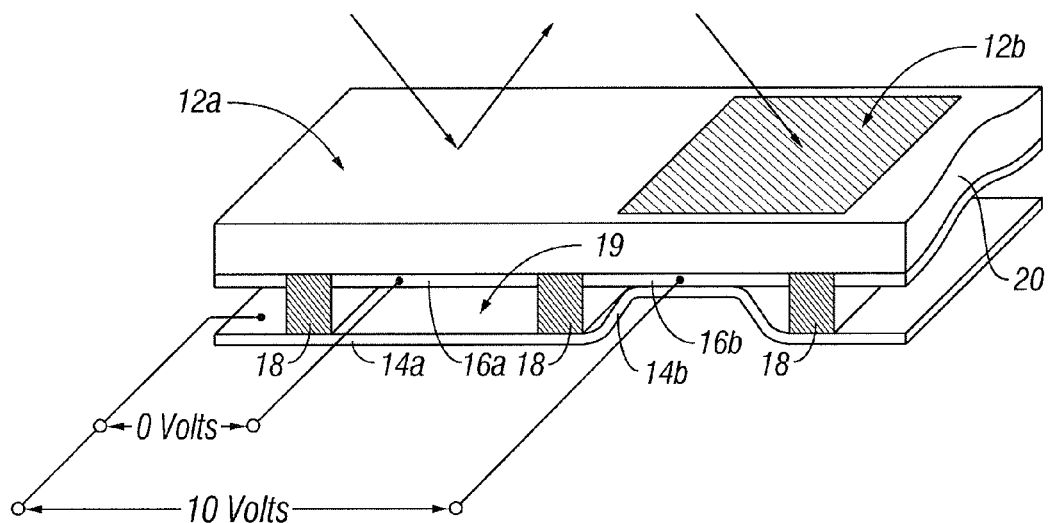
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
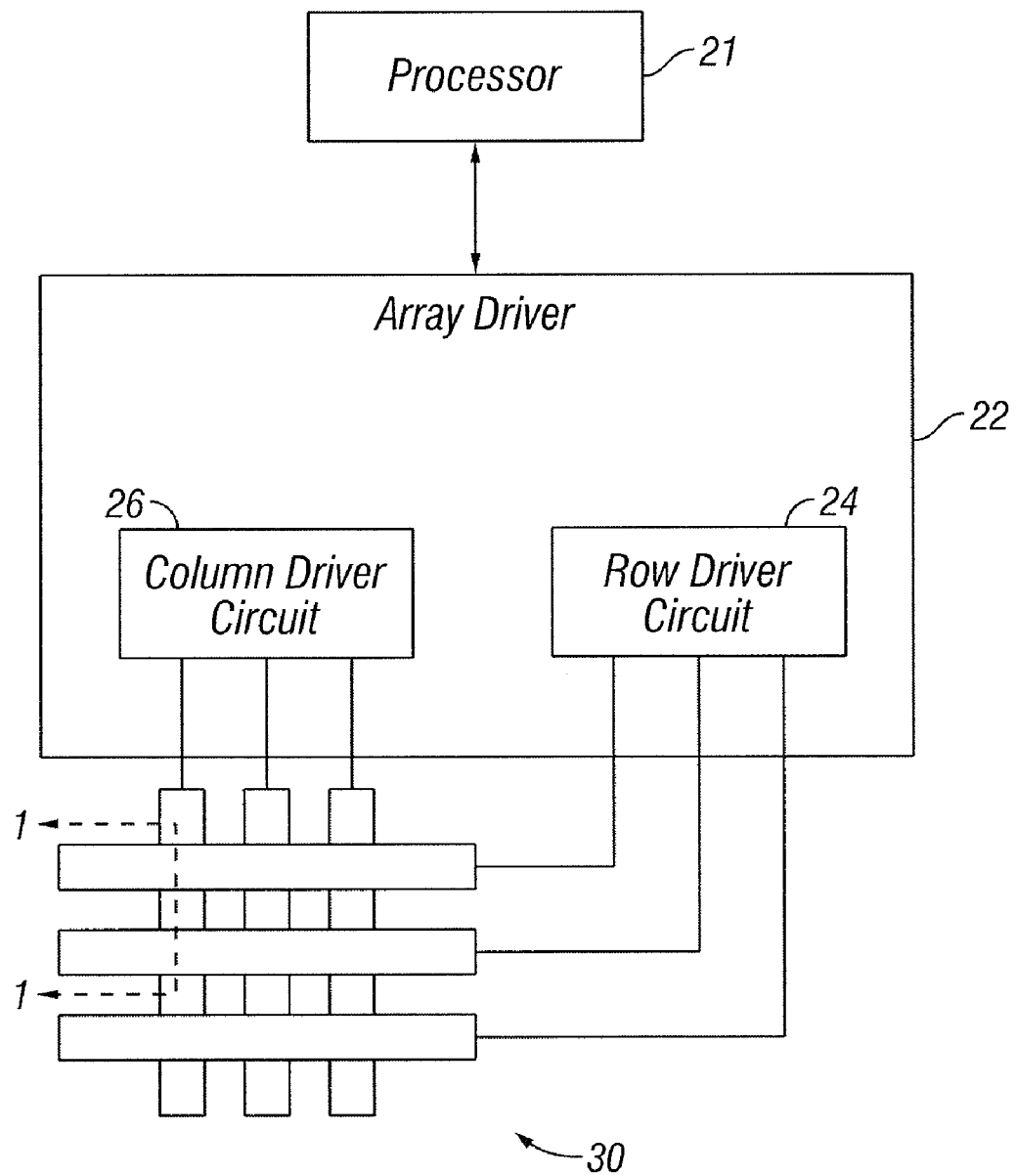
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the rob 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
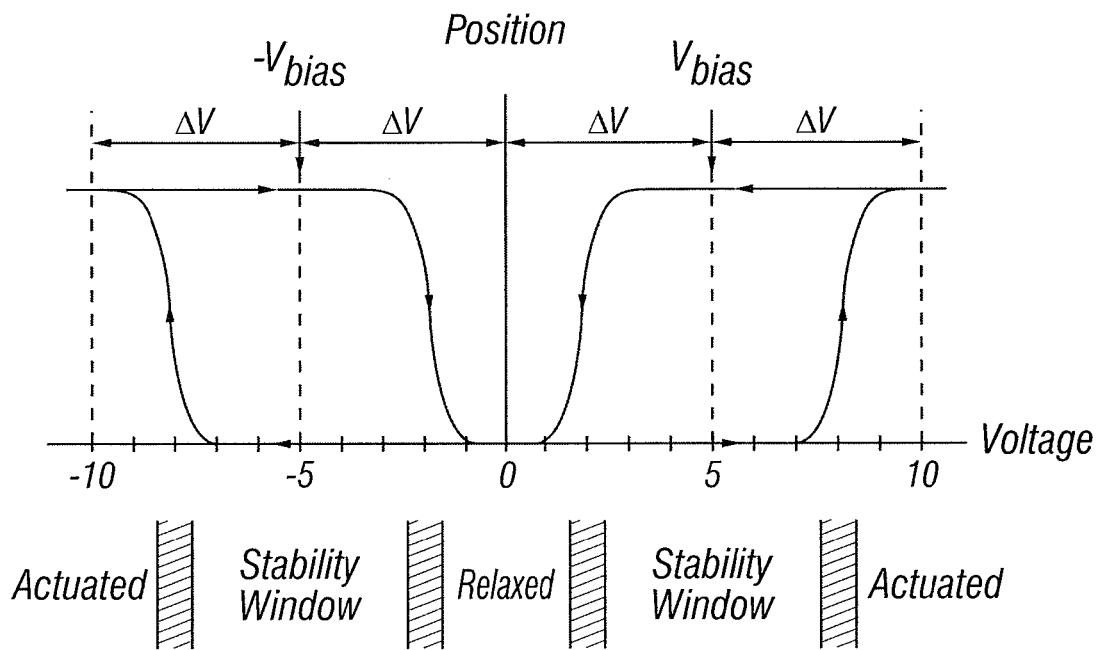
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
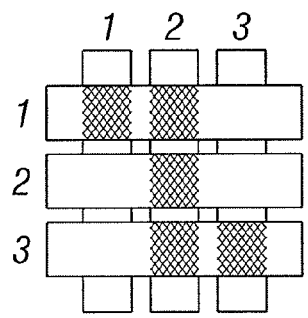
FIG. 5A illustrates one exemplary frame of display data in the 3×3 interferometric modulator display of FIG. 2.
Figure 5B:
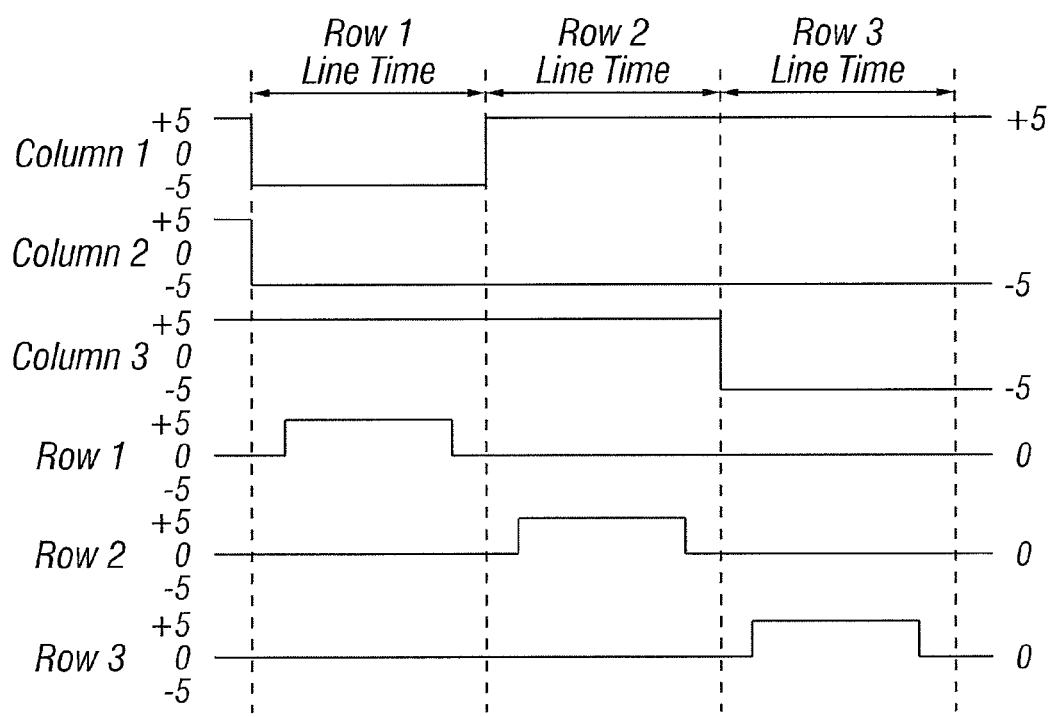
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
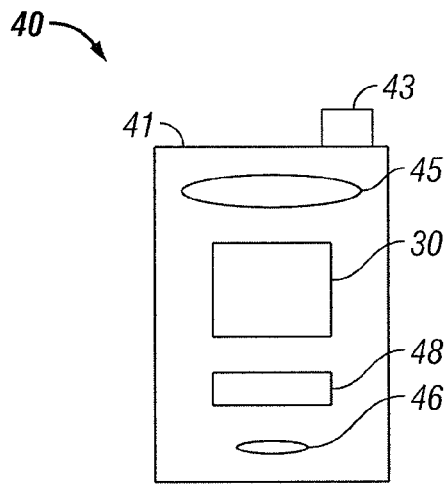
FIGS. 6A and 6B are system block diagrams illustrating an embodiment of a visual display device comprising a plurality of interferometric modulators.
Figure 6B:
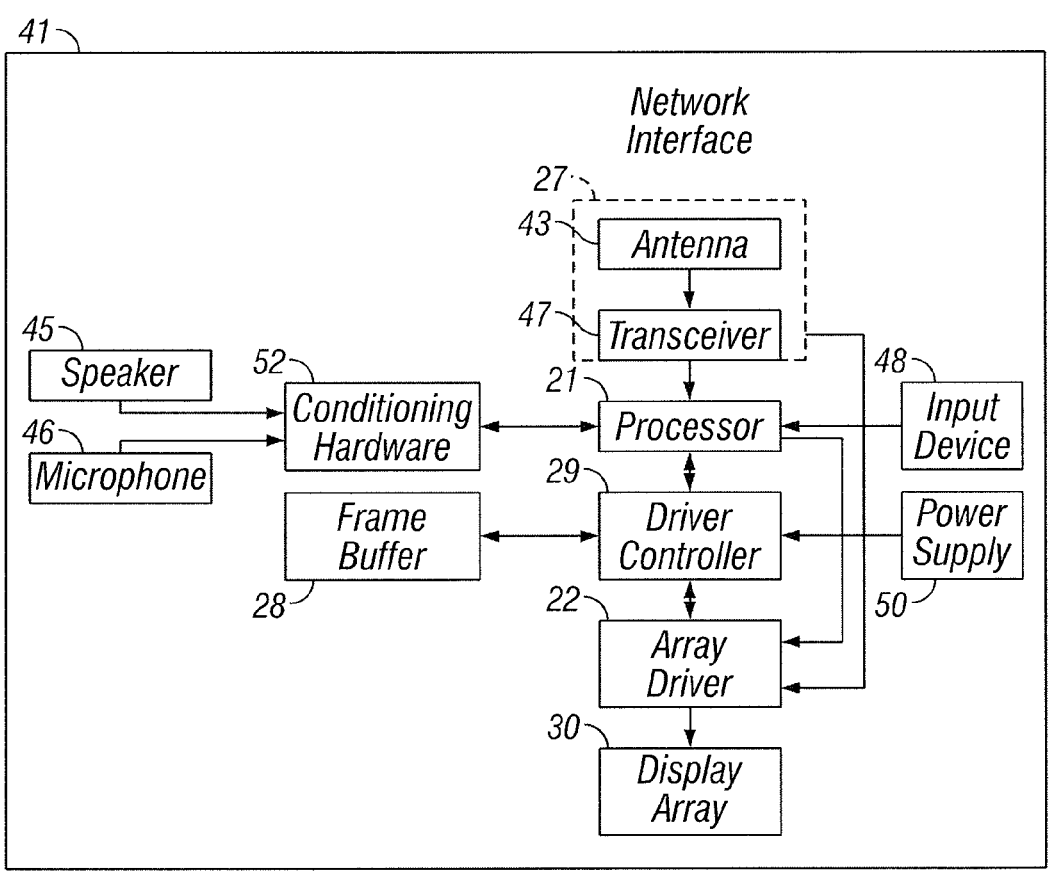

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions, portable media players, and computers.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The processor 21 may also be configured to execute one or more software applications, including a web browser, a telephone application, an email program, or any other software application. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
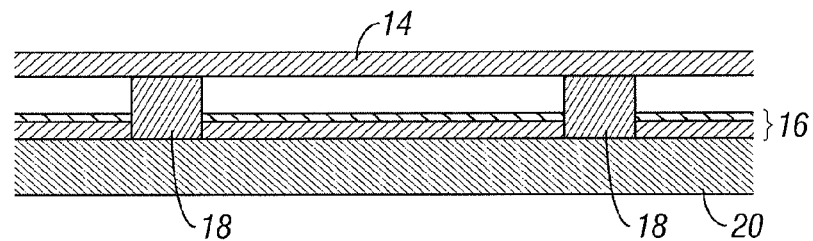
FIG. 7A is a cross section of the device of FIG. 1.
Figure 7B:
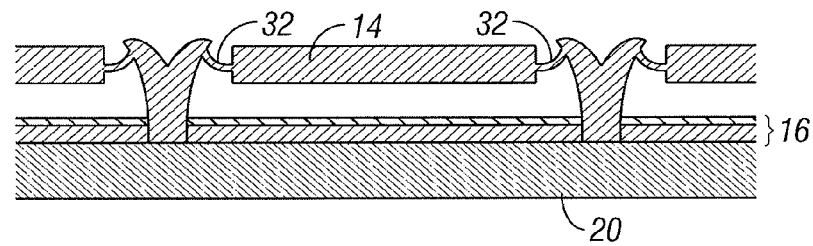
FIG. 7B is a cross section of an alternative embodiment of an interferometric modulator.
Figure 7C:
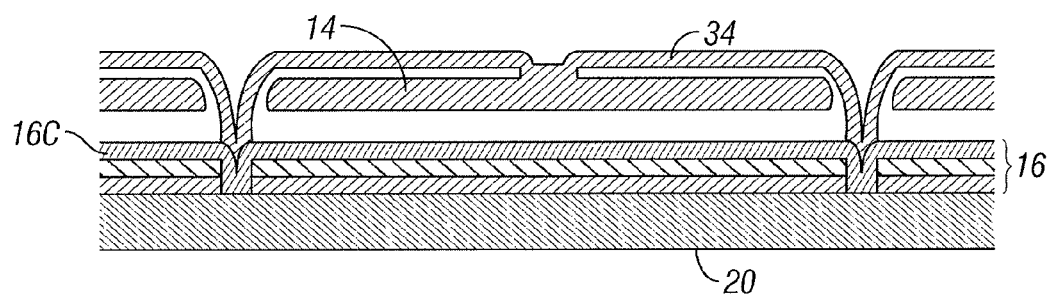
FIG. 7C is a cross section of another alternative embodiment of an interferometric modulator.
Figure 7D:
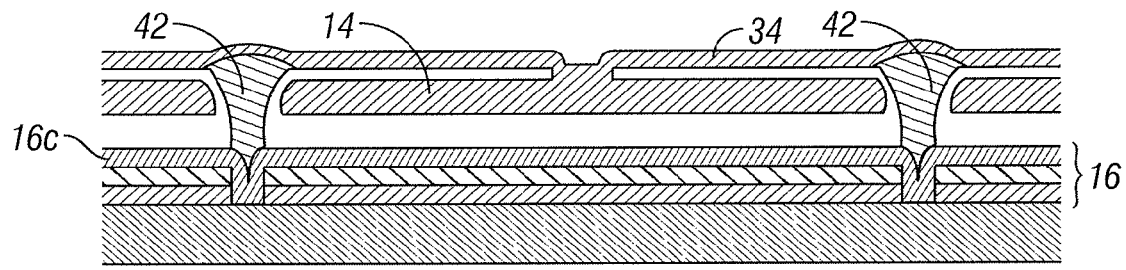
FIG. 7D is a cross section of yet another alternative embodiment of an interferometric modulator.
Figure 7E:
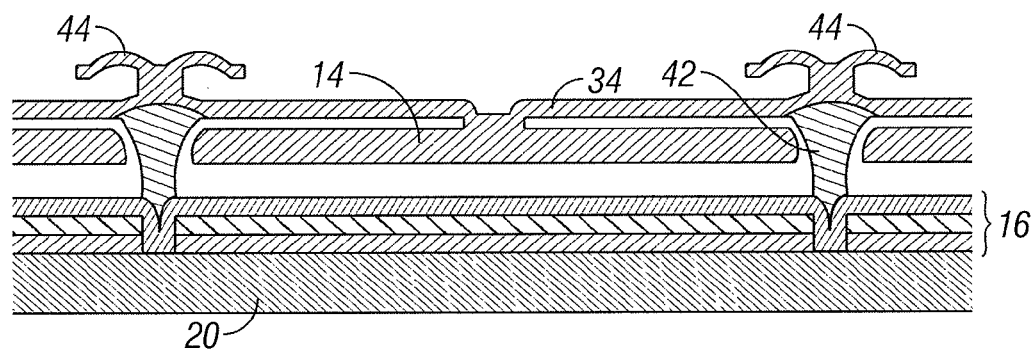
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Thus far, several embodiments of optical devices have been described which include mechanical moving parts. Similar principles can be applied to optical devices with actionable fluids rather than, or in conjunction with, mechanical moving parts. For example, in some embodiments, an interferometric optical stack comprising a reflective layer and a partially reflective, partially transmissive layer can be provided. These layers can be relatively fixed in relationship to one another, resulting in a relatively constant set of wavelengths of light reflected by the interferometric optical stack. Light reflected by the interferometric optical stack can then be modulated using actionable fluids which can be configured to block incident light or allow it to pass through to the interferometric optical stack. In particular, embodiments can use the phenomenon of electrowetting where the hydrophilicity of one or more surfaces is changed by applying an electrical field. An interferometric optical stack can be built on a sealed cavity which, in some embodiments, contains a hydrophobic black fluid (oil) and water. In the absence of an electric field, the one or more surfaces are assumed to be hydrophobic such that the black dye spreads out to occlude a relatively large portion of the interferometric optical stack, resulting in relatively low intensity reflection of incident light. However, when an electric field is applied, the one or more surfaces become hydrophilic, the black dye beads up and occludes a relatively small portion of the interferometric optical stack, resulting in higher intensity reflection. Thus, light can be selectively modulated, where selective modulation includes binary state (on/off) modulation, or modulation in an analog manner with continuously variable light modulation, as described further herein.

Figure 8:
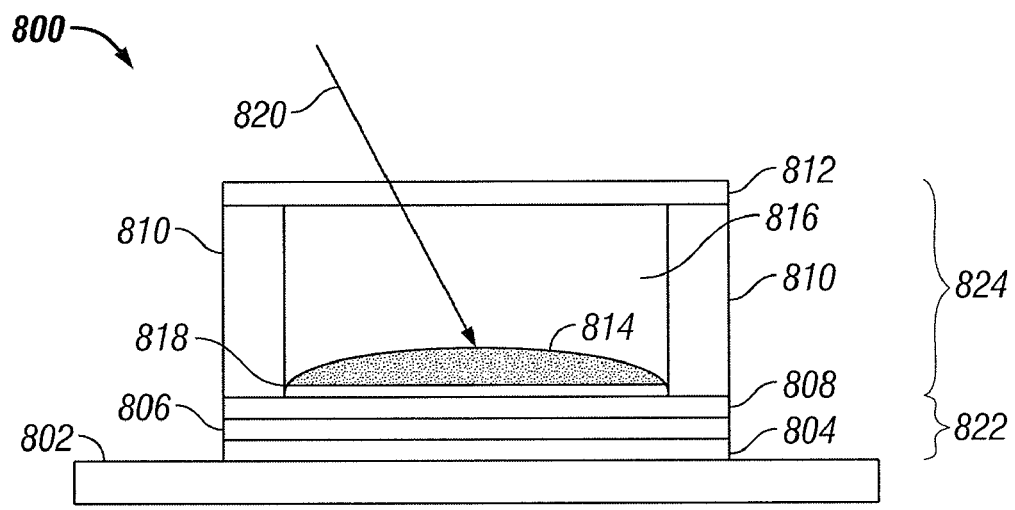
FIG. 8 is a cross-sectional illustration of an optical device for modulating the intensity of light from an interferometric reflector.

FIG. 8 is a cross-sectional schematic representation of an optical device 800. The optical device 800 comprises an at least partially optically transmissive first surface 812 and an optical stack 822 spaced from the first surface 812. The optical stack 822 comprises a reflective first layer 804 and a partially reflective, partially transmissive second layer 808. The optical stack 822 is adapted to reflect light having a set of wavelengths (e.g., visible wavelengths) determined by interference of light reflected from the first layer 804 and the second layer 808. The optical device 800 further comprises a first fluid 814 between the first surface 812 and the optical stack 822. The optical device 800 further comprises a second surface 818 between the first surface 812 and the optical stack 822. The second surface 818 can be located anywhere between the first surface 812 and the optical stack 822. In addition, the device 800 may include more than one instance of the second surface 818. The first fluid 814 covers a first portion of the second surface 818 when a first voltage is applied to the device 800. The first fluid 814 covers a second portion of the second surface 818 when a second voltage is applied to the device 800. In certain embodiments, the first surface 812 and the optical stack 822 define at least a portion of the boundary of a fluid cell 824, as discussed more fully below.

The optical device 800 can be combined with other like devices to form a display for an electronic device such as a cell phone or laptop computer. In certain embodiments, the optical device 800 represents a pixel or sub-pixel of such a display. Two useful characteristics of an optical device for use in a display are the capability to present a selected color to a viewer (e.g. red, green, blue, etc.), as well as to modulate the intensity of the light seen by the viewer. The optical device 800 can perform these two functions with the optical stack 822 and the fluid cell 824, respectively. Optical devices with these capabilities can be combined in various ways to form displays capable of presenting thousands of colors and grayscales. The intensity of light reflected from each optical device 800 within the display can also be modulated in patterns which can form graphical content on the display, such as still images or video.

The optical stack 822 can be configured to display a selected color, or range of colors, by taking advantage of optical interference effects to reflect visible light of certain wavelengths without reflecting visible light of other wavelengths. The optical stack 822 can also be configured to modulate non-visible light such as infrared or UV light. At the most basic level, the optical stack 822 is an optically resonant cavity similar to a Fabry-Perot etalon. In one embodiment, the optical stack 822 comprises a partially reflective, partially optically transmissive layer 808 separated from an optically reflective layer 804 (each of which acts as one mirror of an optically resonant cavity), both generally residing on a substrate 802. The partially reflective, partially transmissive layer 808 can also serve as an optical absorber which can provide for a narrower band of wavelengths reflected by the optical stack 822. In some embodiments, the partially reflective, partially transmissive layer 808 comprises a layer of chromium, germanium, or molybdenum. The optically reflective layer 804 can comprise aluminum. Other materials for these two layers are also suitable. In addition, one or both of the partially reflective, partially transmissive layer 808 and the reflective layer 804 can comprise multiple sub-layers of different materials.

The partially reflective, partially transmissive layer 808 and the reflective layer 804 can be separated by an air gap, but in other embodiments, they are separated by a substantially optically transmissive dielectric layer 806 (e.g. silicon dioxide). The use of the dielectric material to separate the reflective layer 804 from the partially reflective, partially transmissive layer 808 can, in some cases, help prevent gap variations which can compromise the optical performance of the optical device 800. These gap variations can be caused by tilt or curvature of the two surfaces 804 and 808 which may result during fabrication of the device 800 and/or may gradually occur over time. In some embodiments, the dielectric layer 806 may comprise several sub-layers of dielectric materials with different refractive indexes. For example, the dielectric layer 806 may comprise alternating layers of dielectric materials with relatively higher and relatively lower refractive indexes. These dielectric sub-layers can be designed to improve certain optical characteristics of the optical device 800 in ways which are known in the art.

When light is incident upon the optical stack 822, it is reflected to some degree both from the partially reflective, partially transmissive layer 808 and from the reflective layer 804. Depending on the separation between layers 804 and 808 (defining a height of an optical cavity between the two layers 804, 808), and the refractive index of the dielectric layer 806, light of certain wavelengths reflecting from the partially reflective, partially transmissive layer 808 will be slightly out of phase with the light reflecting from the reflective layer 804. Based on the phase difference, some wavelengths will constructively interfere, while others will destructively interfere. For example, the height of the optical cavity may be such that red wavelengths have a phase difference which leads to constructive interference, while green and blue wavelengths have a phase difference which leads to destructive interference. In this case, the human eye will perceive a red color, as red wavelengths will be amplified with respect to green and blue wavelengths. Color generation via interference is much more efficient in its use of light compared to traditional color generation, which works on the principle of absorption and wastes much of the light entering the display. For this reason, a display which produces color via this type of interference effect can be brighter and more vibrant, resulting in iridescent colors.

The thickness and type of material, with its associated refractive index, used to form the dielectric layer 806 can be altered to tune the reflection of the optical stack 822 to a specific range of visible wavelengths which are interpreted by the human eye as a desired color. In certain embodiments, the dielectric layer 806 can have a thickness that corresponds to approximately one half of a wavelength, in the dielectric layer 806, of a selected wavelength of visible light which the optical stack 822 is configured to reflect. A number of optical devices 800, tuned to reflect various visible wavelengths of light, can be assembled in various ways to form a display capable of reproducing thousands of colors. The intensity of light reflected from each optical device 800 can be modulated using the fluid cell 824, as described below.

The fluid cell 824 can be used to modulate the intensity of the light reflected by the optical stack 822. In one embodiment, the fluid cell 824 includes a perimeter wall 810, two portions of which are illustrated in the cross-section of FIG. 8. The perimeter wall 810 defines at least a portion of the boundary of a cavity which contains one or more fluids and is capped by the optically transmissive upper surface 812. In one embodiment, the cavity formed by the perimeter wall 810 can be filled with two different fluids (e.g., liquids) 814 and 816, which are non-soluble in one another so as to remain substantially separated from one another. In certain embodiments, the two fluids 814 and 816 have differing optical characteristics. For example, fluid 814 can absorb visible light, whether uniformly across the visible spectrum or preferentially at selected wavelengths, while fluid 816 can be substantially optically transmissive. Throughout the remainder of this specification, fluid 814 will be referred to as the absorbent fluid, while fluid 816 will be referred to as the transmissive fluid, with the understanding that, in certain embodiments of the invention, other optical characteristics of fluids within the fluid cell 824 may be emphasized other than their relative transmissivity to visible light.

The transmissive fluid 816 can comprise many different materials. For example, the transmissive fluid 816 may comprise water. In embodiments which leverage the phenomenon of electrowetting, as described below, it may also be desirable for the transmissive fluid 816 to be electrically conductive. In these embodiments, the optically transmissive fluid 816 may comprise ionic materials dissolved in water. The ionic materials may be inorganic (e.g. NaCl, KCl, etc.) or organic (e.g. sodium acetate, etc.). Other embodiments could use other types of polar liquids with or without dissolved ionized species to make the transmissive liquid 816 electrically conductive. For example, alcohols such as ethanol and glycerol could be used. Other types of optically transmissive fluids are also suitable.

The absorptive fluid 814, too, can comprise several different materials. For example, in embodiments where the transmissive fluid 816 comprises water, the absorptive fluid 814 can be a non-polar liquid that is non-soluble in water. In certain electrowetting-based embodiments, described below, it may also be desirable for the absorptive fluid 814 to be an electrical insulator. Suitable non-polar liquids can include oils, hydrocarbons, esters, and ethers. If the material used for the absorptive fluid 814 is not naturally absorptive to visible wavelengths of light, any type of suitable dye can be added to the material to form the absorptive liquid 814. In certain embodiments, a mixture of red, green, and blue dyes can be dissolved in the absorptive fluid 814 to tailor the fluid's absorptive properties. For example, red, green, and blue dyes can be added in proportions that make the absorptive fluid 814 substantially equally absorptive to all visible wavelengths. In other embodiments, the absorptive fluid 814 can be tailored to preferentially absorb a specific range of visible wavelengths that are reflected by the optical stack 822. In still other embodiments, the absorptive fluid 814 can be tailored to absorb some other set of visible wavelengths.

The fluid cell 824 can also include the second surface 818. This second surface 818 can be formed anywhere inside the fluid cell 824. In FIG. 8, it is shown adjacent the optical stack 822, but it can also be formed adjacent the optically transmissive upper surface 812. In some embodiments, the fluid cell 824 includes more than one instance of the second surface 818. In other embodiments, one or more other layers of material (e.g. an electrode) can be formed between the selectively wettable surface 818 and either the optical stack 822 or the upper surface 812 of the fluid cell 824.

Under some circumstances, seepage of fluids, or constituents of the fluids (e.g., salts dissolved in the fluids), from the fluid cell 824 to the optical stack 822 can result in the formation of oxidation layers in the optical stack, which may alter the optical performance of the optical stack 822. Moisture can also result in corrosion or other degradation of portions of the optical stack 822. In some embodiments, the partially reflective, partially transmissive layer 808 can be particularly susceptible to harmful effects of moisture due to the thinness of this layer. In some embodiments, the second surface 818, and/or a material between the second surface 818 and the optical stack 822, can act as a moisture barrier to help prevent fluid from the fluid cell 824 from corroding portions of the optical stack 822. For example, a layer of material between the second surface 818 and the optical stack 822 can be made sufficiently thick and/or without significant structural defects such that fluid from the fluid cell 824 does not pose a significant corrosive hazard to portions of the optical stack 822 over a selected lifetime of the optical device 800.

In some embodiments of the invention, the second surface 818 is selectively wettable by the absorptive fluid 814, the transmissive fluid 816, or both the absorptive fluid 814 and the transmissive fluid 816. In certain embodiments, the optical device 800 includes a mechanism for controlling and modulating the relative portions of the second surface 818 that are covered, or wetted, by each of the two fluids within the fluid cell 824. In FIG. 8, the optical device 800 is configured so that the absorptive fluid 814 covers all or a majority of the second surface 818. In this configuration, a light ray 820 incident upon the optical device 800 can pass through the optically transmissive upper surface 812 as well as the transmissive fluid 816. However, the absorptive fluid 814 can be chosen to substantially absorb the light ray 820 before it reaches the optical stack 822. Whether or not the light ray 820 is absorbed by the absorptive fluid 814 will depend upon the absorptive characteristics of the absorptive fluid 814, the spectral transmissivities of the transmissive fluid 816 and the upper surface 812, and the wavelengths of the light ray 820. For the case of a white incident light ray 820, and an absorptive fluid that absorbs all or most visible wavelengths of light, very little visible light incident upon the optical device 800 will be reflected by the optical stack 822 to a viewer.

Figure 9:
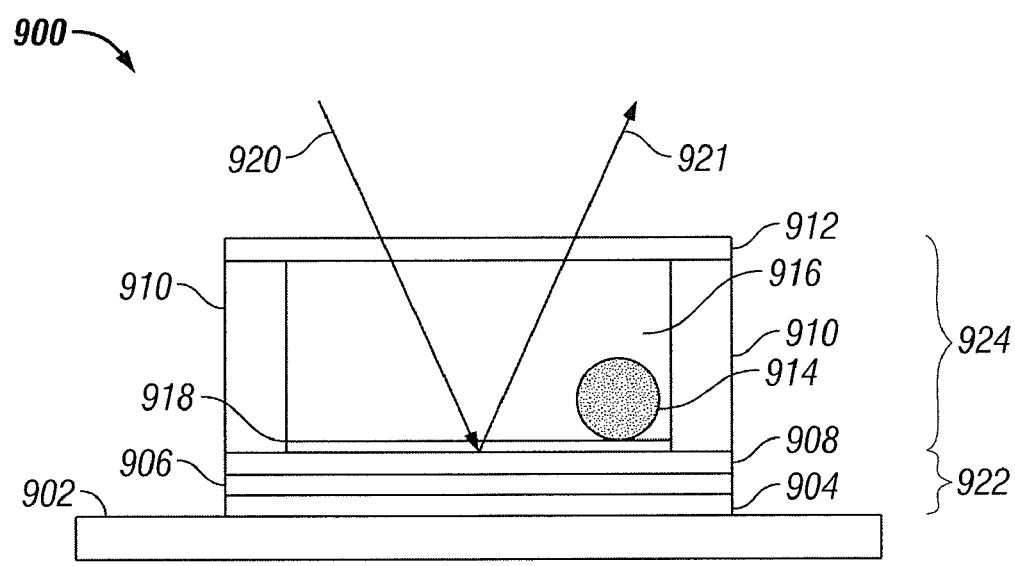
FIG. 9 is a cross-sectional illustration of fluids in an optical device in an actuated position.

In FIG. 9, the optical device 900 is configured, via a controllable mechanism, (examples of which are described below) so that the absorptive fluid 914 only covers a small portion of the second surface 918. In this case, an incident light ray 920 can pass through the optically transmissive upper surface 912, through the transmissive fluid 916, and to the optical stack 922. The nature of the reflection from the optical stack 922 depends upon the configuration of the stack as described above. The optical stack 922 can be designed to reflect red, green, blue, or some other color of light. If for example, the optical stack 922 is designed to reflect red light and the incident ray 920 consists of white light, then the reflected ray of light 921 seen by a viewer will appear red.

The ability to selectively modulate the wettability of relative portions of the second surface 918 that are covered by the absorptive 914 and transmissive 916 fluids advantageously allows for the creation of a variable aperture through which light incident upon the optical device 900 can be reflected. In FIG. 9, the "open" portion of the variable aperture is relatively large, allowing for the reflection of a significant portion of light that is incident upon the optical device 900 and placing the optical device 900 in a "bright" state. In FIG. 8, the "open" portion of the variable aperture is small, such that the aperture is practically entirely closed, placing the optical device 800 in a "dark" state. While FIGS. 8 and 9 only illustrate cases where the variable aperture formed by the absorptive 814 and transmissive 816 fluids is either practically fully open or fully closed, there is a continuous range of intermediate states between these two extremes. In this way, the intensity of light reflected by the optical stack 822 can be modulated in an analog-type manner.

One way of controlling the relative portions of the second surface 818 that are covered by each of the absorptive 814 and transmissive 816 fluids is to use the phenomenon of electrowetting. In embodiments, one of the two fluids 814 and 816 in the fluid cell 824 has a greater affinity for the second surface 818 than the other. The fluid with the greater affinity for the second surface 818 will displace the other fluid and cover, or wet, at least a portion of the second surface 818. The portion of the second surface 818 that is covered by the fluid with the greater affinity for the second surface can depend on several factors, including the volume of the fluid and the degree of its affinity for the second surface 818. Typically, if the volume of the fluid whose affinity for the second surface 818 is sufficiently large, it can cover substantially the entire second surface 818. This is illustrated in FIG. 8, where the absorptive fluid 814 is taken as having a greater affinity for the second surface 818 than the transmissive fluid 816 and covers substantially the entire second surface 818.

The orientation of the fluids 814 and 816 shown in FIG. 8, in certain embodiments, is generally stable because it represents a low energy state of the fluid cell 822 system. However, in certain embodiments, the energy balance can be disturbed by applying an electric field to the system. By upsetting the energy balance of the system, the liquid whose affinity for the second surface 818 is initially less can be made to displace the fluid whose affinity for the surface 818 is initially greater. This can be done, for example, by applying a voltage across a pair of electrodes on either side of the second surface 818. In one embodiment, a portion of the optical stack 822 can serve as one electrode. In this way, an electrically conductive portion of the optical stack 822 can be used as an electrode for the fluid cell 824 such that one separate electrode for the fluid cell 824 can be omitted. The transmissive upper surface 812 can comprise indium tin oxide (ITO) or some other optically transmissive conductor, and can serve as another electrode. Other electrode configurations will be described below.

Typically, in embodiments where the mechanism for modulating the relative portions of the second surface 818 covered by each of the fluids 814 and 816 is the electrowetting phenomenon, one of the fluids 814 and 816 will be an electrical conductor, while the other will be substantially electrically insulative. Furthermore, one electrode can be in electrical communication with the fluid that is electrically conductive. In one embodiment, the optically transmissive fluid 816 is a water-based electrolyte that is electrically conductive, while the absorptive fluid 814 is an oil-based absorptive fluid that is an electrical insulator. The second surface 818 can be an electrical insulating, hydrophobic material such as a fluoropolymer. In certain embodiments in which the second surface 818 is hydrophobic, the oil-based absorptive fluid 814 has a greater affinity for the second surface 818 than does the water-based transmissive fluid 816. When no electric field is applied to the optical device 800, the stable low-energy state of the device 800 is as shown in FIG. 8, where the oil-based absorptive fluid 814 covers a substantial portion of the second surface 818.

However, when a voltage is applied across two electrodes in such a manner as to create an electric field at the hydrophobic second surface 818, the energy balance of the device 800 can be upset, causing the water-based transmissive fluid 816 to displace the oil-based absorptive fluid 814. The resulting configuration is illustrated in FIG. 9 where the oil-based absorptive fluid 914 is beaded up and the second surface 918 is covered to a greater extent by the water-based transmissive fluid 916. This mechanism can be understood by considering that the overall energy of the device 900 can be minimized, once a voltage has been applied to it, by reconfiguring itself so that electrical charges within the electrically conductive water-based electrolyte minimize their separation from charges of the opposite sign on the other side of the hydrophobic second surface 918.

In some embodiments, the thickness of material between the second surface 818 and the optical stack 822 can be selected with respect to the electrical performance of the optical device 800, the moisture blocking characteristics of the material, or both of these considerations. For example, in some embodiments, a thinner layer of material between the second surface 818 and the optical stack 822 can result in greater responsiveness of the transmissive fluid 816 and the absorptive fluid 814 for a given voltage applied to the optical device 800. In other embodiments, a thicker layer of material between the second surface 818 and the optical stack 822 can result in an improved moisture barrier between the fluid cell 824 and the optical stack 822 without significant degradation in the electrical performance of the device 800. In still other embodiments, the thickness of material between the second surface 818 and the optical stack 822 can be selected based on some other consideration, such as the impact of the thickness of the material on the optical performance of the device 800. For example, in some embodiments, it may be advantageous for the thickness of the material between the second surface 818 and the optical stack 822 to be either sufficiently larger or smaller than a selected wavelength of incident light to sufficiently reduce the effect of the layer of material on the optical performance of the device 800.

Figure 10:
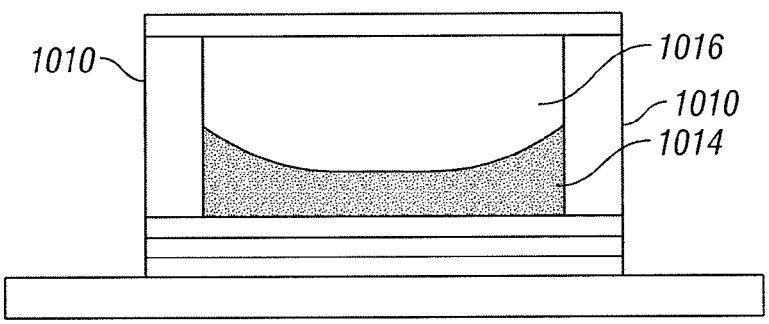
FIG. 10 is a cross-sectional illustration of an optical device having a fluid cell with hydrophobic walls.
Figure 10:
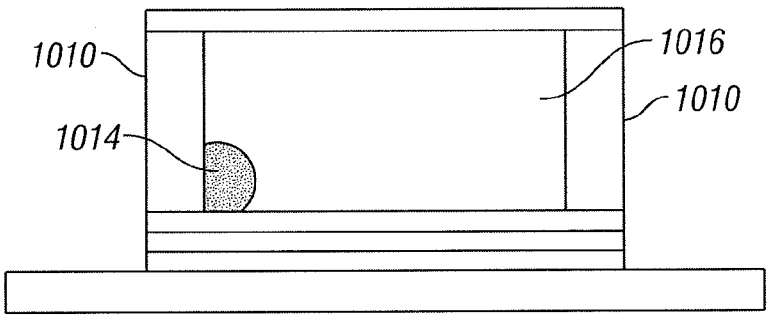

In some embodiments, not only can the second surface 818 comprise hydrophobic material but the perimeter wall of the fluid cell 824 can also be made to be hydrophobic. Such an embodiment is illustrated in FIG. 10, which shows the optical device 800 in an un-actuated state 1030 as well as an actuated state 1032. If the perimeter wall 1010 comprises hydrophobic material, then the oil-based absorptive fluid 1014 may tend to have a concave profile in the stable, un-actuated state 1030. (The opposite would be true if the perimeter wall is hydrophilic and the oil-based absorptive fluid 814 may tend toward a more convex profile, as shown in FIG. 8). In the actuated state 1032, where the oil-based absorptive fluid 1014 is partially displaced by the water-based electrolyte transmissive fluid 1016, the oil-based absorptive fluid 1014 may tend to adhere to the perimeter wall 1010 of the fluid cell, as shown in FIG. 10, which can be beneficial in some applications.

Figure 11:
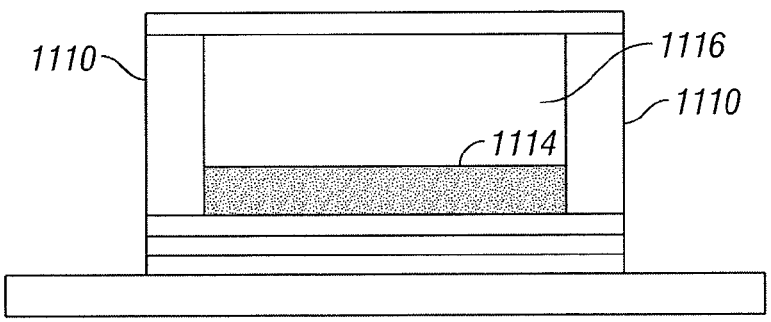
FIG. 11 is a cross-sectional illustration of an optical device having a fluid cell with water-neutral walls.

In other embodiments, the perimeter wall of the fluid cell 824 can be made to exhibit neutral wetting properties. FIG. 11 illustrates the optical device 800 in an un-actuated state 1130, where the perimeter wall 1110 of the fluid cell 824 is water-neutral. In this type of embodiment, the oil-based absorptive fluid 1114 may tend toward a more planar profile in the stable, un-actuated state. The planar profile of the oil-based absorptive fluid 1114 in this type of embodiment can be beneficial in certain cases because it can result in more uniform absorption of light incident upon the optical device 800. In other words, since the thickness of the layer of absorptive fluid 1114 is relatively uniform over the lower surface of the fluid cell 824, the amount of light absorbed by the absorptive fluid 1114 will also tend to be relatively uniform for light incident upon it, regardless of the precise point of incidence upon the absorptive fluid 1114.

While embodiments are described which utilize the electrowetting phenomena with the absorptive fluid being an electrical insulator and the transmissive fluid being an electrical conductor, it should be understood that these roles could also be reversed in other embodiments. In other embodiments, the second surface 818 could be hydrophilic rather than hydrophobic. In still other embodiments, the second surface 818 could exhibit neutral wetting properties towards water and a hydrophobic fluid, and the relative affinities of the fluids for the second surface 818 could be based on some other characteristic.

FIGS. 12-15 illustrate various electrode configurations which can be used in various embodiments. Additional electrode configurations will also be apparent to those skilled in the art based upon these figures. As previously mentioned, a portion of the optical stack 822 could serve as an electrode in some embodiments. For example, in certain embodiments, the reflective layer 804 and the partially reflective, partially transmissive layer 808 of the optical stack 822 can be made of aluminum and chromium, respectively. In these embodiments, either layer could serve as an electrode. In other embodiments, the dielectric layer 806 could function as an electrode if it is formed from an optically transmissive, electrically conductive material, such as ITO. In this way, the reflective layer 804, the partially reflective, partially transmissive layer 808, and/or the dielectric layer 806 can serve dual functions; each layer can contribute to the optical performance of the optical stack 822 as well as the electrical performance of the fluid cell 824. This overlapping functionality between portions of the optical stack 822 and the fluid cell 824 can allow for fewer structures and/or components in the optical device 800 and can result in a compact design. In addition, the overlapping functionality between portions of the optical stack 822 and the fluid cell 824 can result in improved performance of the optical device 800 (e.g. speed, efficiency, etc.) that typically result from reduced dimensions in electrical and optical devices.

Figure 12:
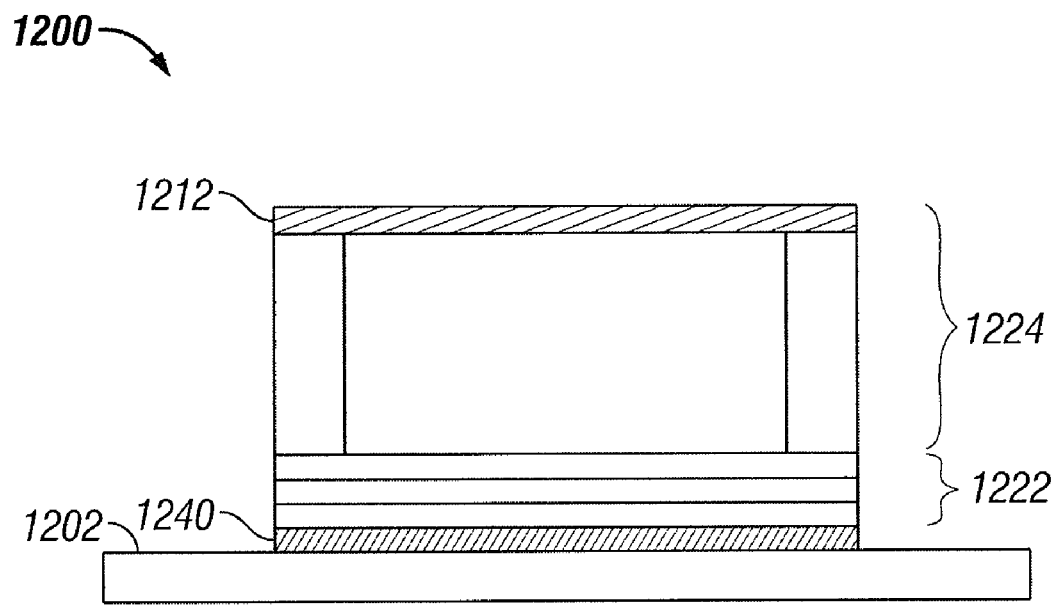
FIG. 12 is a cross-sectional illustration of an example electrode configuration for an optical device.

FIG. 12 illustrates another embodiment where a separate electrode 1240 is formed upon a substrate 1202 underneath the optical stack 1222. Such embodiments can provide the advantage of selecting the electrode 1240 material based upon its electrical characteristics, rather than basing the selection at least partially upon its optical characteristics, because the electrode 1240 does not lie in the optical path of light that is incident upon the optical device 1200. In FIG. 12, the transmissive first surface 1212 of the optical device 1200 serves as a second electrode. This second electrode can be formed from an optically transmissive conductive material, such as ITO, so as to avoid any deleterious effects on the optical performance of the device 1200 by the electrode 1212.

Figure 13:
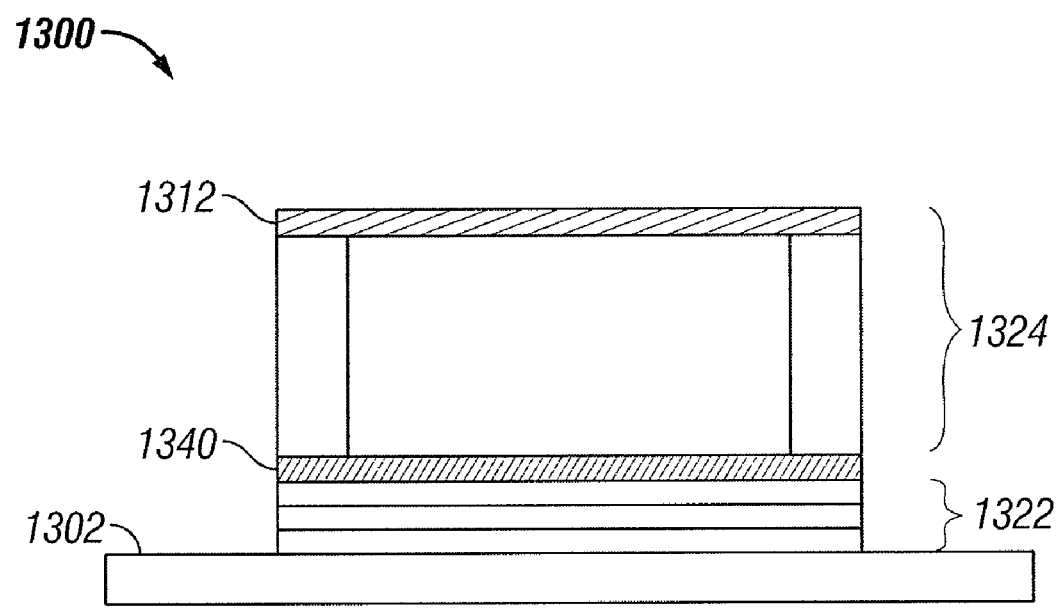
FIG. 13 is a cross-sectional illustration of an example electrode configuration for an optical device.

FIG. 13 illustrates another electrode configuration that can be used in some embodiments where the bottom electrode 1340 is located over the optical stack 1322. This location places the electrode 1340 in the optical path of light that is incident upon the optical device 1300. Therefore, in some embodiments, the electrode 1340 may comprise an optically transmissive electrical conductor. In this type of configuration, the electrode 1340 is nearer the fluid cell 1324, which, in some cases, can allow for stronger electrical interactions between the electrode 1340 and the fluid cell 1324 for a given voltage than might otherwise be possible with the configuration shown in FIG. 12.

Figure 14:
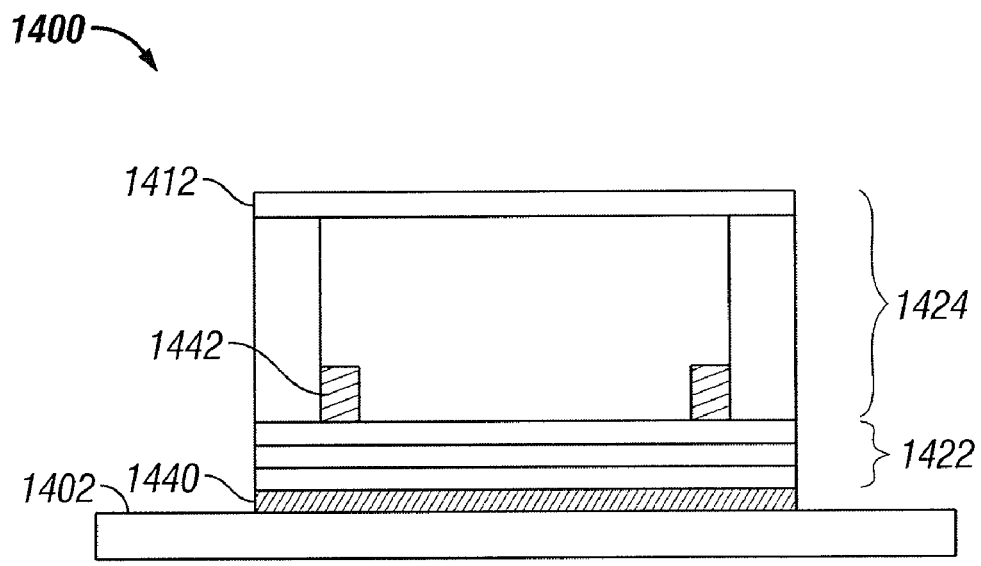
FIG. 14 is a cross-sectional illustration of an example electrode configuration for an optical device.

FIG. 14 illustrates an electrode configuration where an upper electrode 1442 is located within the fluid cell 1424. For example, in certain embodiments, the electrode is a ring (e.g., a polygonal ring, such as a rectangular ring or a hexagonal ring) inside the fluid cell 1424, shown in cross-section in FIG. 14. A possible advantage of this type of embodiment is that it allows a material to be chosen for the first surface 1412 of the fluid cell 1424 without the constraint that the material act as an electrical conductor. In other words, the material for the upper surface 1412 of the fluid cell 1424 can be chosen primarily with regard to the material's optical characteristics, rather than electrical characteristics. Many variations on this configuration will be apparent to those skilled in the art. In some embodiments, the perimeter wall of the fluid cell 1424 could be formed out of electrically conductive material, allowing the wall itself to serve as an electrode.

Figure 15:
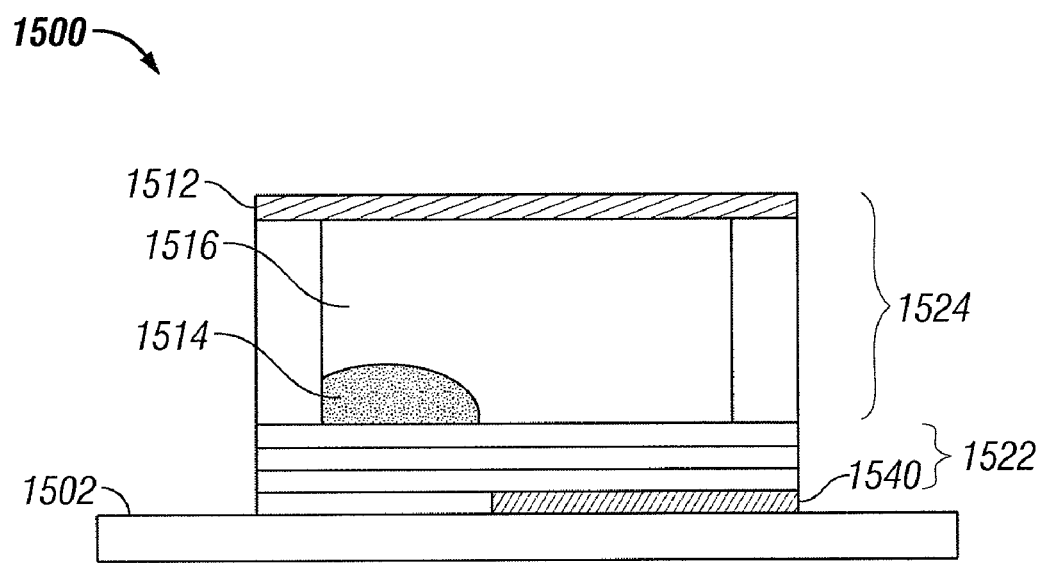
FIG. 15 is a cross-sectional illustration of an example electrode configuration for an optical device.

FIG. 15 is illustrative of an embodiment which can be practiced with many different electrode configurations to influence the end location of the absorptive fluid 1514 when the optical device 1500 is in an actuated state. As shown, the bottom electrode 1540 is positioned nearer one side of the optical device 1500, offset with respect to electrode 1512, so that electrical charges within the electrically conductive transmissive fluid 1516 will become concentrated nearer the bottom electrode 1540, displacing the absorptive insulating fluid 1514 toward the side of the optical device 1500 in a predictable manner. In much the same manner, the electrode material, size, shape, and position can be selected to cause the fluids 1514 and 1516 within the fluid cell 1524 to actuate in desirable, predictable ways.

Figure 16:
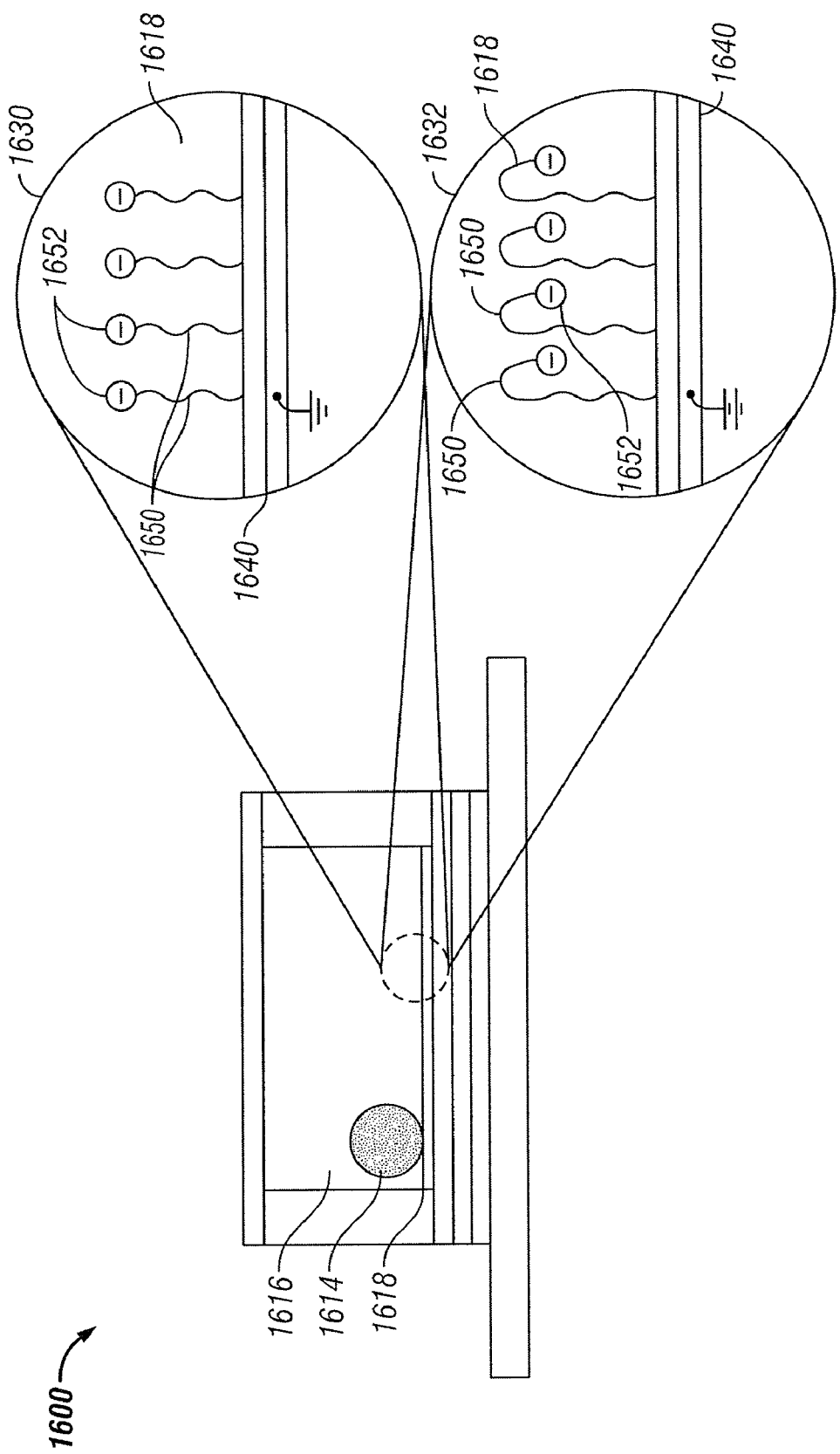
FIG. 16 is a cross-sectional illustration of an example selectively wettable surface in an optical device.

As was previously mentioned, there are several different mechanisms for controlling the respective portions of the second surface (e.g., 818) which are covered by the absorptive fluid (e.g., 814) and the transmissive fluid (e.g., 816). The electrowetting phenomenon has been given as one exemplary mechanism. FIG. 16 indicates a second type of mechanism which can be used in certain embodiments. Inlay 1630 shows a magnified view of the second surface 1618 of the optical device 1600 which reveals that the surface comprises molecular chains. Inlay 1630 illustrates the molecular chains in an un-actuated state, while inlay 1632 illustrates the molecular chains in an actuated state.

Each molecular chain can include a head portion 1652 and a tail portion 1650. The head portions 1652 can be hydrophilic, while the tail portions can be hydrophobic. Known surfactants provide examples of this type of molecular chains. In addition, the head portions 1652 can be electrically charged. When a voltage is applied across two device electrodes, the orientation of the molecular chains can be altered so as to form a hydrophobic surface or a hydrophilic surface. For example, when a lower electrode 1640 is grounded, the hydrophilic head portions 1652 of the molecular chains can be presented to the interior of the fluid cell of the optical device 1600. This configuration can tend to make the second surface 1618 have hydrophilic characteristics on a macroscopic scale, resulting in the displacement of an oil-based absorptive fluid 1614 by a water-based transmissive fluid 1616.

In contrast, when a lower electrode 1640 becomes positively charged, the negatively charged head portions 1652 will be attracted toward the electrode 1640. This can cause the molecular chains to bend and present the hydrophobic tail portions 1650 to the interior of the fluid cell of the optical device. In this case, the second surface 1618 can be made to display a hydrophobic characteristic on a macroscopic scale, resulting in the formation of an oil-based absorptive fluid 1614 layer spread over the second surface 1618. Unlike the electrowetting embodiments described above, the dominant phenomenon in this case is not that the application of a voltage to the device electrodes upsets the energy balance of the fluid cell system to re-orient the fluids 1614 and 1616. Instead, the very nature of the second surface 1618 is altered between hydrophobic and hydrophilic states, or anywhere in between, which in turn causes the fluids 1614 and 1616 to become re-oriented and provide modulation of light incident upon the optical device 1600.

With any of the above-described embodiments, fabrication of the optical device (e.g., 800) can be done using techniques, such as photolithography, which are known in the art. With respect to FIG. 8, for example, a substrate 802 can be provided. An electrode and optical stack 822 can then be formed upon the substrate 802. Upon this assembly, the perimeter wall of the fluid cell 824 and the second surface 818 can be formed. Finally, the fluid cell 824 can be filled with the absorptive fluid 814 as well as the transmissive fluid 816 and the cell can be capped and sealed by the transmissive first surface 812. The optical device 800 can also be fabricated by forming the optical stack 822 on a first substrate 802 and forming the fluid cell 824 on a second substrate (not shown). The first and second substrates can then be fixed in proximity to one another to form the optical device 800.

A plurality of optical devices 800 can be formed on the substrate 802 to create displays which incorporate a plurality of pixels. Advantageously, pixels of different colors can be achieved by altering the thickness of the dielectric layer 806 at different locations on a substrate 802 to achieve a desired wavelength range of reflectivity of the corresponding optical stacks 822 at those locations. In this way, red, green, and blue pixels, for example, can be formed on the substrate 802.

In embodiments where a plurality of optical devices 800 are formed on a substrate 802, it may be desirable to form an electrical bus which interconnects certain ones of the plurality of optical devices 800 for controlling the devices. As discussed herein, portions of the optical stack 822 can function as electrodes in some embodiments. A plurality of these electrodes can be interconnected to form an electrical bus. In some embodiments where a portion of the optical stack 822 comprises an electrode, it can be advantageous to use the partially reflective, partially transmissive layer 808 as the electrode due to its close proximity to the fluid cell 824. The closer proximity of the electrode can result in improved responsiveness of the fluids within the fluid cell 824 for a selected voltage. However, in some embodiments, the relatively small thickness of the partially reflective, partially transmissive layer 808 can result in relatively high electrical resistances which may, in certain circumstances, limit the length of an electrical bus that comprises the partially reflective, partially transmissive layer 808 of several devices 800 and which could lengthen the response time (e.g., the RC time constant) of the device to applied voltages.

In contrast, the reflective layer 804 can be made with a greater thickness than the partially reflective, partially transmissive layer 806, since it need not be partially optically transmissive. Therefore, in some embodiments, an electrical bus can be formed by interconnecting the reflective layers 804 from each of a plurality of optical devices 800. In addition, to maintain the advantages of an electrode which is in closer proximity to the fluid cell 824 of each of the plurality of optical devices 800, vias can be formed to electrically connect the partially reflective, partially transmissive layer 808 and the reflective layer 804 of each of the plurality of optical devices 800. Such vias can be formed according to any technique known in the art and can be positioned between separate ones of the plurality of optical devices 800, or underneath the perimeter walls 910 of the optical devices 800, to reduce their impact upon the optical performance of the optical stack 822 of each of the optical devices 800. Other positions for the interconnecting vias between the partially reflective, partially transmissive layer 808 and the reflective layer 804 are also possible. Unlike conventional interferometric devices in which the partially reflective, partially transmissive layer is at a different voltage than is the reflective layer in order to selectively create an electrostatic attraction between these layers, the layers 804, 806 in certain embodiments described herein can be in electrical communication with one another to advantageously provide electrical conductivity to an electrode of the fluid cell 824.

Figure 17:
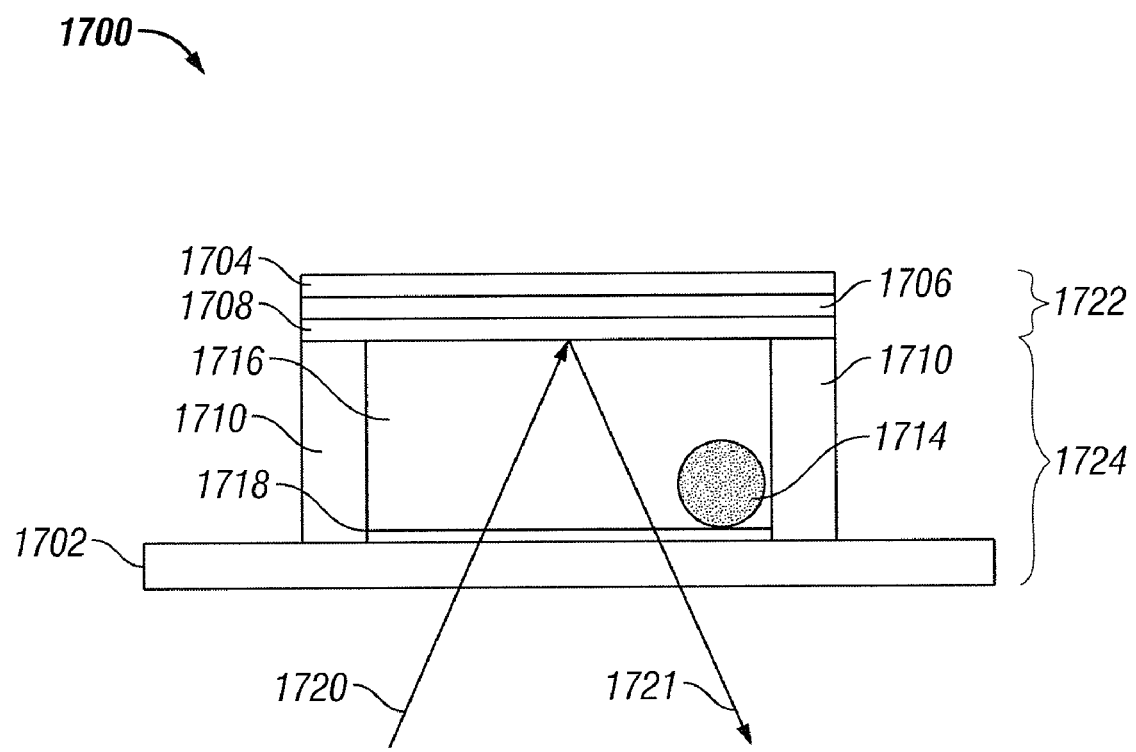
FIG. 17 is a cross-sectional illustration of another embodiment of an optical device for modulating the intensity of light from an interferometric reflector

FIG. 17 illustrates another embodiment of the optical device of FIG. 8. Optical device 1700 can be considered as an inverted version of optical device 800. In this embodiment, a light ray 1720 is incident upon, and passes through, the substrate 1702. Therefore, the substrate 1702 can preferably comprise an optically transmissive material such as glass. Depending upon the state of actuation of the fluid cell 1724, the ray 1720 passes through the transmissive fluid 1716 and reflects from the optical stack 1722 in a ray 1721 directed toward a viewer. The operation of the optical device 1700 is analogous to what has been described with respect to optical device 800. Fabrication, too, can be similarly done. For example, a substrate 1702 can be provided. In some cases an electrode 1718 can be formed on the substrate 1702. A perimeter wall 1710 of the fluid cell 1724 can then be formed on the substrate 1702 or, in some cases, an electrode, of the form described with respect to FIG. 14, can be incorporated into the perimeter wall 1710. The cavity created by the formation of the fluid cell perimeter wall 1710 can then be filled with a sacrificial material (e.g., Mo), and the layers of the optical stack 1722 can be formed on the resulting surface. Once the optical stack 1722 has been formed, the sacrificial material can be removed (e.g., by etching with XeF2 flowed into an opening (not shown) in the fluid cell 1724) and the fluid cell 1724 can be filled with the absorptive 1714 and transmissive 1716 fluids. Finally, the fluid cell 1724 can be sealed. The optical device 1700 can also be fabricated by forming the fluid cell 1724 on a first substrate 1702 and forming the optical stack 1722 on a second substrate (not shown). The first and second substrates can then be fixed in proximity to one another to form the optical device 1700.

In still other embodiments, an optical device (not shown) includes a fluid cell (e.g., 824) formed in proximity to a MEMS interferometric modulator. A suitable MEMS interferometric modulator is described herein and is illustrated, for example, in FIGS. 1 and 7A-7E. For example, with reference to FIG. 7A, the fluid cell can be formed on the transparent substrate 20 on the side opposite the movable reflective layer 14. Many other arrangements of a fluid cell in proximity to a MEMS interferometric modulator are also possible. An optical device of this sort can modulate light with two mechanisms. For example, light incident upon the optical device can be modulated by movement of the movable reflective layer 14 and by movement of fluids within the fluid cell, as described herein.

A plurality of optical devices, as described herein, can be combined to form displays for electronic devices. For example, each optical device can serve as a display pixel or sub-pixel. FIGS. 6A and 6B are system block diagrams illustrating an embodiment of an electronic device which can incorporate a display 30 which comprises a plurality of optical devices as illustrated in FIGS. 8-17. A potential advantage is that battery life in an electronic device which incorporates a display comprising optical devices of the sort illustrated in FIGS. 8-17 can be enhanced, compared to other types of displays, because the optical devices described herein only require power when the fluid cell system is actuated.

Various specific embodiments have been described in connection with the accompanying drawings. However, a wide variety of variation is possible. Components and/or elements may be added, removed, or rearranged. Additionally, processing steps may be added, removed, or reordered. While only a few embodiments have been explicitly described, other embodiments will become apparent to those of ordinary skill in the art based on this disclosure. Therefore, the scope of the invention is intended to be defined by reference to the appended claims and not simply with regard to the explicitly described embodiments.

What is claimed is:

1. An optical device comprising:
an at least partially optically transmissive first surface;
an optical stack spaced from the first surface, the optical stack comprising
a reflective first layer,
a partially reflective, partially transmissive second layer, wherein the reflective first layer has a greater thickness than the partially reflective, partially transmissive second layer, and
a dielectric third layer that separates and supports the first and second layers in a fixed relationship with respect to one another to create an optically resonant cavity between the first and second layers, the optical stack adapted to reflect light having a set of wavelengths determined by interference of light reflected from the first layer and from the second layer;
a first fluid between the first surface and the optical stack; and
a second surface between the first surface and the optical stack, the first fluid covering a first portion of the second surface when a first voltage is applied to the device, and the first fluid covering a second portion of the second surface when a second voltage is applied to the device.

2. The device of claim 1, wherein the second surface is positioned between the first surface and the first fluid.

3. The device of claim 1, wherein the second surface is positioned between the optical stack and the first fluid.

4. The device of claim 1, wherein the second layer comprises chromium and the first layer comprises aluminum.

5. The device of claim 1, wherein the dielectric layer comprises silicon dioxide.

6. The device of claim 1, wherein the first fluid comprises a liquid having a relatively low affinity for the second surface.

7. The device of claim 6, wherein the liquid comprises a substantially optically transmissive, water-based electrolyte.

8. The device of claim 1, wherein the first fluid comprises an optically absorptive liquid.

9. The device of claim 8, wherein the optically absorptive liquid comprises a hydrophobic liquid.

10. The device of claim 9, wherein the hydrophobic liquid comprises oil and one or more colored dyes.

11. The device of claim 8, wherein the optically absorptive liquid absorbs light having a predetermined range of visible wavelengths.

12. The device of claim 1, further comprising a second fluid between the first surface and the optical stack, wherein the first and second fluids are substantially non-soluble in one another, one of the first and second fluids being substantially non-absorptive to visible light, the other being substantially absorptive to visible light.

13. The device of claim 12, wherein the first fluid has a substantially lower affinity for the second surface than does the second fluid.

14. The device of claim 12, wherein the first fluid is electrically conductive and the second fluid is substantially non-conductive.

15. The device of claim 1, wherein the second surface comprises an optically transmissive layer of electrically insulating, hydrophobic material.

16. The device of claim 15, wherein the hydrophobic material comprises a fluoropolymer.

17. The device of claim 1, wherein the second surface is selectively configurable as hydrophobic when the first voltage is applied to the device and hydrophilic when the second voltage is applied to the device.

18. The device of claim 17, wherein the second surface comprises a plurality of molecular chains having hydrophilic end portions and hydrophobic body portions.

19. The device of claim 1, wherein the device further comprises a first electrode and a second electrode, the first and second voltages applied across the first and second electrodes.

20. The device of claim 19, wherein the first and second electrodes are located on opposing sides of the second surface.

21. The device of claim 19, wherein one of the first and second electrodes is in electrical communication with the fluid.

22. The device of claim 19, wherein one of the first and second electrodes comprises at least a portion of the optical stack.

23. The device of claim 19, wherein the first surface comprises one of the first and second electrodes.

24. The device of claim 1, wherein the reflective first layer and the partially reflective, partially transmissive second layer are electrically connected.

25. The device of claim 24, further comprising at least one via electrically connecting the first layer and the second layer.

26. The device of claim 1, further comprising a moisture barrier layer between the optical stack and the first fluid.

27. The device of claim 26, wherein the moisture barrier comprises the second surface.

28. A display including the optical device of claim 1, comprising:
a processor that is configured to communicate with said display, said processor being configured to process image data; and
a memory device that is configured to communicate with said processor.

29. The display of claim 28, further comprising a driver circuit configured to send at least one signal to said display.

30. The display of claim 28, further comprising an image source module configured to send said image data to said processor.

31. The display of claim 30, wherein said image source module comprises at least one of a receiver, transceiver, and transmitter.

32. The display of claim 28, further comprising an input device configured to receive input data and to communicate said input data to said processor.

33. The display of claim 29, further comprising a controller configured to send at least a portion of said image data to said driver circuit.

34. A method of modulating light, comprising:
providing an optical device comprising
an at least partially optically transmissive first surface;
an optical stack spaced from the first surface, the optical stack comprising
a reflective first layer,
a partially reflective, partially transmissive second layer, wherein the reflective first layer has a greater thickness than the partially reflective, partially transmissive second layer, and
a dielectric third layer that separates and supports the first and second layers in a fixed relationship with respect to one another to create an optically resonant cavity between the first and second layers, the optical stack adapted to reflect light having a set of visible wavelengths determined by interference of light reflected from the first layer and from the second layer;
a first fluid between the first surface and the optical stack; and
a second surface between the first surface and the optical stack;
applying a first voltage to the device to cause the first fluid to cover a first portion of the second surface; and
applying a second voltage to the device to cause the first fluid to cover a second portion of the second surface.

35. The method of claim 34, wherein the second portion has a larger area of the second surface than does the first portion.

36. The method of claim 35, wherein the second portion comprises the first portion.

37. A method of forming an optical device, comprising:
forming an optically transmissive first surface;
forming an optical stack, the optical stack comprising
a reflective first layer,
a partially reflective, partially transmissive second layer, wherein the reflective first layer has a greater thickness than the partially reflective, partially transmissive second layer, and
a dielectric third layer that separates and supports the first and second layers in a fixed relationship with respect to one another to create an optically resonant cavity between the first and second layers;
forming a perimeter wall of a cavity between the first surface and the optical stack; and
placing fluid in the cavity.

38. The method of claim 37, wherein the optically transmissive first surface is formed on an optically transmissive substrate.

39. The method of claim 37, wherein the optical stack is formed on a substrate.

40. The method of claim 37, wherein forming the perimeter wall of the cavity comprises depositing a sacrificial material and then removing the sacrificial material.

41. The method of claim 37, further comprising forming an optically transmissive, electrically insulating, hydrophobic second surface between the first surface and the optical stack.

42. An optical device comprising:
means for at least partially transmitting incident light;
means for reflecting light having a set of visible wavelengths determined by interferometry, wherein the means for reflecting light comprises
reflective first means, partially reflective, partially transmissive second means, wherein the reflective first means has a greater thickness than the partially transmissive second means, and
third means for creating an optically resonant cavity between the first and second means; and
means for selectively varying an optical transmissivity of a region between the at least partially transmitting means and the reflecting means upon application of a voltage to the device.

43. The optical device of claim 42, wherein the means for at least partially transmitting incident light comprises an at least partially optically transmissive first surface.

44. The optical device of claim 42, wherein the means for reflecting light comprises an optical stack spaced from the at least partially transmitting means, and wherein the reflective first means comprises a reflective first layer, the partially reflective, partially transmissive second means comprises a partially reflective, partially transmissive second layer, and the third means comprises a dielectric layer that separates and supports the first and second layers in a fixed relationship with respect to one another, the optical stack adapted to reflect light having a set of visible wavelengths determined by interference of light reflected from the first layer and from the second layer.

45. The optical device of claim 42, wherein the means for selectively varying an optical transmissivity comprises an absorptive fluid in the region between the at least partially transmitting means and the reflecting means, the absorptive fluid covering a first portion of a surface when a first voltage is applied to the device, and the absorptive fluid covering a second portion of the surface when a second voltage is applied to the device.

* * * * *